June 26, 1956 E. C. OKRESS ET AL 2,752,485
ULTRAHIGH FREQUENCY WAVE CONTROL MEANS
Filed July 17, 1942

INVENTORS
E. C. OKRESS
D. G. CLIFFORD
BY
ATTORNEY

United States Patent Office 2,752,485
Patented June 26, 1956

2,752,485

ULTRAHIGH FREQUENCY WAVE CONTROL MEANS

Ernest C. Okress and David G. Clifford, Montclair, N. J., assignors to Westinghouse Electric Corporation, a corporation of Pennsylvania Application July 17, 1942, Serial No. 451,356

14 Claims. (Cl. 250—13)

In its broader aspect this invention relates to receiving and transmitting energy in the form of electromagnetic waves and involves an understanding of wave propagation through hollow-metal wave guide channels or conduits, as well as an understanding of resonance in hollow metallic bodies. More specifically it relates to a novel switch which is connected between the transmitter and receiver and serves the purpose of protecting the receiver during the transmission pulse. Switches for this purpose are known in the trade as TR boxes.

For purposes of orienting the present invention to its place in the realm of electronic and micro-wave art it would appear appropriate to consider the phenomena of wave propagation in its relation to the invention here to be described and have appreciation of what transpires in the hollow-metallic guide. Generally, "wave guide" is used to describe the means by which electro-magnetic energy is propagated in hollow tubes from one place to another before its ultimate transmission in free space if that is to be done. It is also desirable to consider wave energy in a hollow-body resonator for a clear understanding of the present invention.

A wave guide includes the provision of a dielectric such as air within a channel, frequently referred to in the trade as "plumbing," extending from place to place and constituting a boundary laterally engirdling the dielectric. Plumbing is accordingly metallic and of high electrical conductivity (brass or copper being generally used). Its cross-sectional dimension has a definite relation to the character of the wave transmitted thereby. Consideration will be given the "plumbing" both of rectangular and of circular cross-section and in each case the term "tube" is used synonymously with "wave guide."

Hollow-tube guided waves are capable of transmission in an indefinitely large number of patterns each being distinguished by a characteristic distribution of component electric and magnetic fields comprising the waves. The lines of electric intensity and lines of magnetic intensity, or rather sheets, in the wave guide are mutually orthogonal and give what may be called a cross-sectional picture of the wave.

While there are numerous patterns in the hollow tube guide it has been found that they fall into either of two broad modes, namely, transverse electric or transverse magnetic depending upon whether they have a component of magnetic or electric vector in the direction of propagation. The transverse electric mode resulting in an H wave, is identified by the fact that a component of the magnetic vector exists along the direction of propagation and that an electric vector is normal to the direction of propagation. The transverse magnetic mode, resulting in an E wave, is identified by the fact that there exists an electric component along the direction of propagation and a magnetic vector normal to the direction of propagation. For purposes of this description, an E wave may be considered to be a hollow-tube guided wave having both a longitudinal and a transverse component of electric field, but only a transverse magnetic field, whereas an H wave may be considered to be a hollow-tube guided wave having both a longitudinal and a transverse component of magnetic field but only a transverse electric field. Thus the TE mode gives rise to an H wave and the TM mode gives rise to an E wave.

These two modes are further subdivided by appending to each integer subscripts, appearing thus: $TE_{l,m}$. In the consideration of wave guides, only the cross-sectional parameters need be specified in order to identify a particular type of wave. When a resonator is under consideration the length then is introduced as an additional parameter, thus $TE_{l,m,n}$ and $TM_{l,m,n}$.

In rectangular cross-sectional type of wave guides the wave is defined uniquely as $H_{l,m}$ or $E_{l,m}$ where the integer "$l$" defines the order of the wave along the shorter cross-sectional dimension of the guide the magnitude of which is determined by the number of half-period variations of electric intensity along that dimension. The integer "$m$" defines the number of half-period variations of electric intensity along the longer cross-sectional dimension of the guide. In the present specification consideration of propagation of electromagnetic energy is wholly confined to the use of the H wave with zero order ($l=0$) and unit mode ($m=1$) or $H_{0,1}$ wave, first to avoid unnecessary ramification, second, because the $H_{0,1}$ wave has the simplest field configuration and, third, because it has the lowest critical frequency as well as the smallest attenuation of any of the hollow-tube waves. A picture of this type of wave is shown in Figures 10, 11 and 12.

In the cylindrical wave guide the same subscripts are used as with the rectangular wave guide, but subscript "$l$" now defines the number of full-period variations of the radial component of the electric field along the angular co-ordinate and "$m$" defines the number of half-period variations of angular component of electric field along the radial co-ordinate. An additional subscript is added and designated by the letter "$n$" and defines the number of half-period variations of radial component of electric field along the axial coordinate. For the resonator it is desirable to choose such a wave which will not have a longitudinal current flow so that a movable piston can be introduced which does not have to make mechanical contact with the walls of the resonator chamber. This is an advantage because sliding frictional joints are undesirable. The type of wave which will satisfy this requirement in the cylindrical resonator is the type known as the $H_{0,1,1}$ wave or the 0,1,1 transverse electric mode. The configuration of this field is shown in Figures 13 and 14.

In the present invention a wave guide of rectangular cross-section is shown and preferred, so it may be further added that the wave length in the rectangular hollow-wave guide is defined by the relation, for the $H_{0,1}$ wave as $$\lambda_{H_{0,1}} = \frac{\lambda_f}{\left[1 - \left(\frac{\lambda_f}{2b}\right)^2\right]^{1/2}}$$

where $\lambda$ (lambda) represents the wave length in the guide, $\lambda_f$ that in free space, and $b$ represents the longer cross-sectional dimension of the rectangular guide. Such a guide has a critical wave length above which no propagation through the guide can exist. This is equal to twice the longer cross-sectional dimension of the guide.

The invention likewise preferably utilizes a cylindrical type resonator, so that it may also be here added that the resonance of the transverse electric mode frequency is defined by $$\nu_{l,m,n} = \sqrt{\left(\frac{cn}{2L}\right)^2 + \left(\frac{cr'_{l,m}}{2\pi b}\right)^2}$$

where $\nu$ (nu) defines the frequency and the subscripts "$mn$" represent the integers referred to above, $c$ is the velocity of light in free space, L is the length of the resonator; $b$ is the internal radius of the resonator and $r'_{1,m}$ represents the root of the expression of $$J'_i(r'_{l,m})=0$$

and $$J'_i(r'_{l,m})Y'_i\left(\frac{a}{b}r'_{l,m}\right)-J'_i\left(\frac{a}{b}r'_{l,m}\right)Y'_i(r'_{l,m})=0$$

for the perfect coaxial type resonator for the same mode. J' and Y' represent the derivative of the first and second kind of Bessel functions. Letter "$a$" represents the outer radius of inner conductor. Numerical values for some of the roots $r'_{1,m}$ can be found in Jahnke and Emde "Tables of Functions with Formulae and Curves."

Use of reflection of radio waves for various purposes, such as determination of altitude of an airplane to ground, for locating one airplane from another or from a fixed station, and for other purposes, is an accomplished fact. The wave is generated, passed to the antenna and into space, reflects from the object addressed, returns to the antenna and thence to the receiver. A switch of automatic character has to be provided to keep the projected pulse from passing through the receiver at the time of projection but which will permit the reflected pulse to operate the receiver. Such a switch is now commonly referred to as a "TR box." The present invention is directed primarily to an improved TR box capable of use with a wave guide. It will undoubtedly be immediately evident that the degree of delicacy of operation of the TR box is highly important and that the high power of the outgoing signal shall not paralyze or even filter through to the receiver, and yet the faintest of reflected signal is to be passed through the switch to the receiver. Technically, the TR box must possess a high Q when receiving and a low Q when transmitting. For clearcut reception, it is also a desideratum to eliminate all modes of oscillation except the one for which the apparatus is designed and tuned.

The present invention accordingly has for its primary object the provision of a switch or TR box meeting the exacting requirements outlined above and with greater effectiveness than accomplished by devices of the prior art.

More specifically, an object of the invention is to provide a TR box having maximum range of Q factor for the transmitted and received pulses.

Another object of the invention is to suppress and/or eliminate undesired modes of oscillation.

A further object of the invention is to provide a TR box adaptable to wave guide use.

A still further object of the invention is to accelerate breakdown of the gap when resonant potential builds up.

Again, an object of the invention is to provide for adjustment of gap of the breakdown switch.

Still further objects of the invention will appear as the description progresses, both by direct recitation thereof and by implication from the context.

Referring to the accompanying drawing in which like numerals of reference indicate similar parts throughout the several views.

Figure 10:
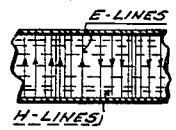
Figure 11:
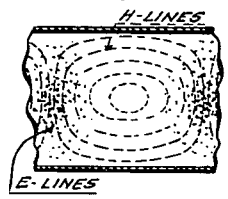
Figures 8, 12, 13:
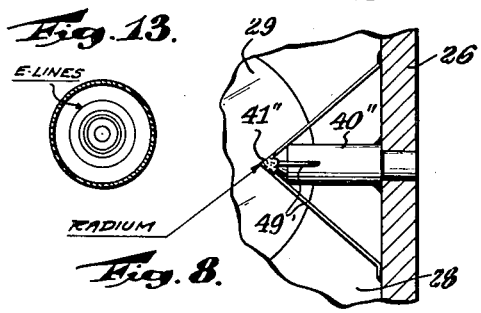
Figure 8 is a further sectional view in the vicinity of the cathode similar to Figs. 3 and 6 and showing another modified construction.
Figure 14:
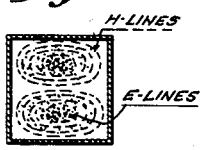

Figures 10, 11 and 12 are respectively a longitudinal vertical, a transverse vertical and a horizontal section of a rectangular hollow tube wave guides showing patterns of the H and E fields in dotted and full lines respectively for the $H_{0,1}$ mode; and Figures 13 and 14 are similar transverse sectional longitudinal sectional views of a perfect cylindrical or coaxial resonator and fields therein for the $H_{0,1,1}$ mode.

Figure 9:
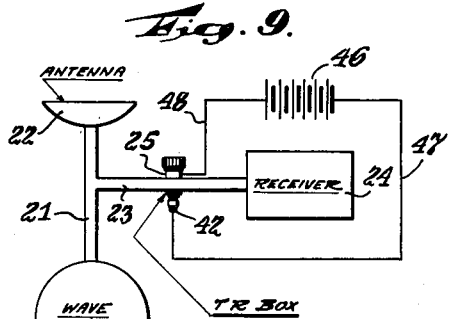
Figure 9 is an elevation of the switch in its associated relationship with transmitting and receiving apparatus.

In the specific embodiment of the invention illustrated in said drawing reference is first made to Figure 9 wherein is illustrated the general assembly of apparatus comprising a wave generator 20 productive of high pulse energy of desired frequency promulgated as $H_{0,1}$ waves longitudinally of a wave guide or tube 21 of rectangular cross-section. Such waves may be directionally transmitted into free space directly from the wave guide or through the agency of an antenna or otherwise. Preferably the waves are sent forth from a parabolic device, which for brevity and ease of reference will be termed an antenna 22 which can be moved about for directing the wave path or beam in a desired direction and toward an object. The invention is preferably used in conjunction with ultra high frequency radio waves an advantage of which has the property of straight forward projection and reflection in substantially the same manner as light waves. Accordingly, the projected wave energy directed toward some object, such as an airplane, reflects therefrom and on its return course between outgoing pulses is intercepted by the antenna 22 which concentrates the wave to re-enter wave guide or tube 21 and travel therein and through a branch tube 23 to a receiver 24 which is then excited by the returned wave. Obviously the returned wave energy will be very weak as compared to the high power of the energy produced by the wave generator. The TR box 25 is interposed in branch tube 23 between the receiver and generator and between the receiver and the antenna to automatically prevent the high power energy from destroying or interfering with the receiver and yet permitting the receiver to be actuated in consequence of the relatively weak power of the returning signal between pulses.

The switch or TR box of the present invention preferably comprises a cylindrical body of metal with a fixed end 26 and a threaded cap 27 opposite thereto. Said body is hollow, providing a resonator chamber 28 next said fixed end. The diameter of said body portion is slightly less than the long cross-sectional dimension of the wave guide tube so the TR box may extend transversely of and through the tube. Apertures, sealed by windows 29 of material transparent to the wave energy, are provided at parts of the resonator body within the wave guide. The windows are of suitable dielectric material, such as low loss glass, and serve as means for passing the flow of wave energy in the guide through the resonator. Said windows are suitably dimensioned, both as to diameter and thickness and with due consideration to their dielectric constant, to introduce a minimum of disturbance and still give sufficient coupling between the resonator chamber and the wave guide. These windowed apertures are shown circular, though they need not be, and concentric with a diameter of the resonator and with the centerline of the adjacent wave guide. The windowed apertures are preferably as small as practicable for still obtaining desired energy transfer without undue lessening of the surface continuity of the resonator. The area of the windows to a considerable extent controls the coupling coefficient detail discussion of which is out of place here. As the resonator is evacuated in manufacture, whereas the wave guide is not, the windows for the apertures are made vacuum tight. Glass used as the material comprising these windows may be formed and sealed in place.

It is necessary to tune the resonator, which is done by means of a piston 30 coaxial with the resonator and having a piston face 31 toward the fixed end to define the resonator chamber therebetween. Said piston 30 is constructed to provide a cylindrical peripheral skirt 32 extending rearwardly from said piston face and resonator chamber in a further part of the hollow interior of the cylindrical body 25, which part will for convenience be designated skirt chamber 33. Furthermore the said skirt 32 and peripheral edge of the piston face are spaced so as to avoid contact with the cylindrical body, an annular gap 34 being provided therebetween. The said skirt is a quarter wave length in axial dimension. The presence of the skirt chamber places a very high impedance across the gap 34 at the rear or open peripheral edge of the skirt, that impedance is reflecting to a resulting low impedance between the cylinder and the piston across the gap at the periphery of the forward or face part of the piston. The effect is electrical continuity between the piston face and adjacent chamber wall without need of physical contact thereat. Surface currents in the piston face 31 normally flow in a circular path on the piston face and cylindrical wall under influence of the adopted $H_{0,1,1}$ wave in the resonator chamber.

Tuning of the resonator is obtained by moving the piston toward or from the fixed end wall of the resonator chamber. For this purpose suitable means, such as that shown especially in Figure 3, may be provided which is operable from the exterior of the resonator body. The illustrated construction provides an axially disposed piston rod 35 integral with the piston and extending to and through aforementioned threaded cap 27. Said rod has a fixed shoulder 36 thereon next the inner face of the cap and retaining means, such as nut 37, at the outside of the cap. The cap may thus rotate without rotating the piston or piston rod, but advancement or retraction of the cap axially will apply similar movement to the piston.

Appropriate vacuum seal is provided for the portion of the interior of the body portion which constitutes the resonator and skirt chambers. As shown, a flexible diaphragm 38 centrally girdles the piston rod and is sealed thereto, the diaphragm extending across the remaining cross-sectional area of the chamber and flanged at its edge where it is vacuum sealed to the cylindrical inner face of the body of the device. The part of the diaphragm transverse to the piston rod and cylinder will flex axially as the piston rod is moved back or forth within the tuning range of the device.

In performing its function as a TR box, the resonator is constructed to set up a very high impedance toward the transmitter side when a large signal or pulse is propagated in the "plumbing" toward the receiver. In greater detail this means that some spark mechanism is placed in the resonator which is ineffective during small signals or small pulses and allows the energy to pass through more or less but substantially unattenuated. On the other hand, however, during the time when a large pulse is received, the spark gap discharges and shorts out the large signal thereby reducing the Q of the resonator and cutting down the transmission through the TR box to protective values. This discharge occurs during the high pulse because a very high electric gradient is set up between the spark gap electrodes properly positioned in the resonator. The use of such a spark gap in the cylindrical resonator containing the spark gap electrodes coaxial with its axis will not permit an easy computation of the resonant frequency of the system since it is more or less a mixture of perfect coaxial resonator and a hollow-body type, namely, between an $H_{0,1,1}$ perfect coaxial and an $H_{0,1,1}$ perfect cylindrical resonator the formulas for which are different. Nevertheless, the types of wave defined above can be and are set up.

Figure 1:
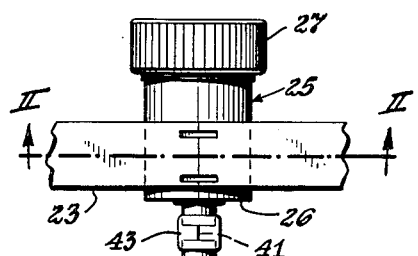
Figure 1 is an elevation of our improved TR box or switch situated in place in a hollow wave guide.
Figure 2:
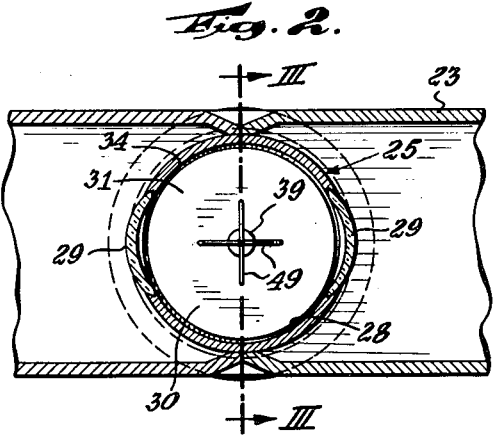
Figure 2 is a sectional view on line II—II of Figure 1, the scale of drawing being somewhat larger than used in Fig. 1.
Figure 4:
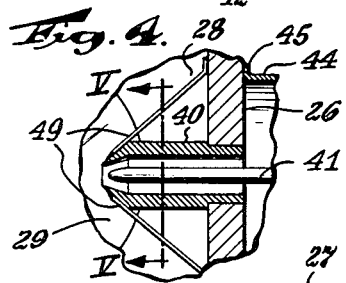
Figure 4 is a still further enlarged sectional view similar to Fig. 3 and showing a portion only thereof in the vicinity of the part referred to as the "keep-alive"
Figure 5:
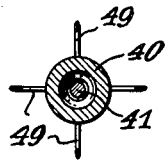
Figure 5 is a sectional view on line V—V of Fig. 4.
Figure 3:
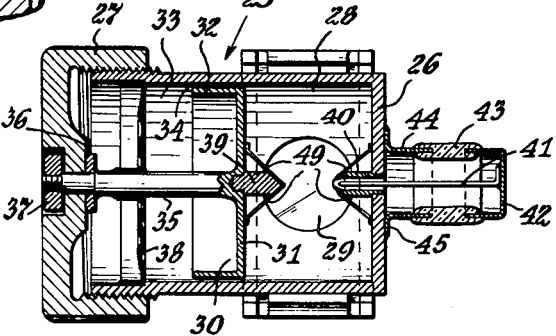
Figure 3 is a sectional view taken longitudinally of the switch and transversely of the wave guide on line III—III of Fig. 2.

The spark gap is shown in Figures 3, 4 and 5 as comprised by axially disposed electrodes 39, 40 of which one, 39, is fixed on the piston and projects inwardly of the resonator toward the other spark gap electrode 40. Similarly, electrode 40 is fixed on the fixed end wall of the resonator and projects inwardly of the resonator toward the other gap electrode. The fact that one of these electrodes (namely 39) is upon the piston, movement of the piston also effects an adjusting movement of the electrode. The gap width controls the magnitude of the electric fields required at a given pressure for breaking down that particular gap. When the gap breaks down due to the requisite high fields being attained by virtue of the strength of the pulse, the system becomes completely detuned, reducing the transmission through the aperture 29 to practically negligible values which means that the energy is reflected back toward the source of the original strong pulse thereby protecting the receiver connected at the other end of the branch wave guide in which the TR box is situated.

As it has been found that there is a time lag, infinitesimal though it may be, in the high fields becoming effective to break down the gap between electrodes 39, 40, it becomes definitely desirable to obtain greater promptness in this respect. Generally speaking for the moment, this objective is attained by utilizing an ionizable gaseous medium in the resonator and a keep-alive electrode therein by which a gas ionization is maintained and thereby supplying the desired ionizing radiation across the gap. Consequently when resonant potential builds up across the gap the moment of breakdown of the gap is accelerated, thus reducing the time lag in operation. Accordingly, the resonator body is first evacuated after which approximately one millimeter (or more if desired) of an appropriate gas is admitted. Suitable gases for the purpose include hydrogen, nitrogen, water-vapor, air or a combination of these, as well as other gases alone or in combination.

The keep-alive electrode may assume various forms, of which that shown in Figs. 3, 4 and 5 is exemplary. In conjunction therewith, fixed gap electrode 40 is made tubular with its outer end opening through the fixed end wall of the resonator. Axially coincident with the inside wall of the tubular electrode 40 and out of contact therefrom is situated a rod constituting the keep-alive electrode 41. The inner end of said keep-alive or rod electrode 41 projects into the resonator substantially as far as the tubuar electrode 40 projects. In the other direction, namely, outwardly, the rod electrode projects beyond the fixed wall of the resonator and is secured to and supported by a metallic cup 42. The cylindrical wall of said cup is spaced from the rod, projects toward the resonator and is sealed in one end edge of a glass cylinder 43, the other end edge of which is sealed to a metallic collar 44 having a flange 45 secured flatwise upon the fixed end wall of the resonator. Said rod electrode accordingly projects through said collar 44 and glass cylinder 43 and into cup 42 to the inside bottom wall of which it is attached. Electrical separation of the rod and its supporting cup is thus maintained from other parts of the TR box. An adequate difference of potential is maintained between tubular electrode 40 and its coaxial make-alive electrode 41 to promote the desired ionizing radiation. As shown in Fig. 9, a battery 46 is indicated as illustrative of a source of potential and one pole thereof is connected by wire 47 to said cup 42 whereas the other pole makes connection 48 with the body of the resonator and accordingly effectively connects with the tubular electrode.

The $H_{0,1,1}$ mode herein adopted is not the lowest order mode for the particular resonator shown, and hence it is desirable to introduce a damping feature properly positioned to critically dampen the undesired modes. A convenient means for the purpose comprises a plurality of wires 49 converging to an apex at or toward the axial end point of the gap electrode. Such wires are shown for both electrodes 39 and 40, and in the one instance the wires extend and are attached to the front face 31 of the piston symmetrically around but at a distance from the electrode 39. The wires are four in number in the present showing and may thus be considered in pyramidal arrangement. Likewise four wires 49 symmetrically disposed in a pyramidal arrangement extend from the inner end of tubular electrode 40 to the fixed end wall 26 of the resonator body. The wires in this instance stop short of the actual apex so as not to close the inner open end of the tubular electrode. Care should be exercised in constructing this dampening means to utilize wires of sufficiently small gauge that they shall not form boundaries and thereby change the mode of oscillation in the resonator. Each said wire preferably has a resistance of 30 ohms. Said wires are soldered or otherwise secured at their respective ends to the electrodes and resonator wall or piston, and thus each forms part of a closed circuit or loop of which the electrode and resonator wall or piston form the completing portions.

Figure 7:
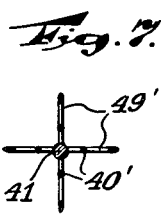
Figure 7 is a sectional view on line VII—VII of Fig. 6.
Figure 6:
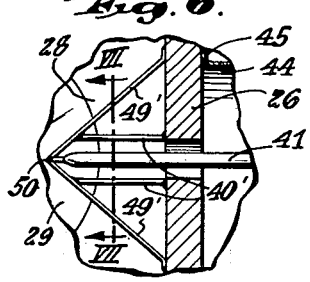
Figure 6 is a sectional view in the vicinity of the cathode similar to Fig. 4 and showing a modified construction.

It will be understood that modifications of structural details of the invention may be utilized within the spirit and scope of the invention. For instance, the gap electrodes may be otherwise constructed, and a variation thereof is shown in Figures 6 and 7. We have there shown the fixed end wall 26 for the resonator as before, through which projects the keep-alive electrode 41. In this showing, however, the pyramidal or converging dampening wires 49' continue to an apex 50 opposite the axial end of the said electrode 41, out of contact therewith as before. This apex region of the wires constitutes the end of the gap electrode. Additional wires 40' parallel to each other and to the rod or keep-alive electrode are also to be considered as part of the gap electrode. These parallel wires are preferably four in number to agree with the number and situation of the pyramidal wires, each of the parallel wires being secured, as by soldering, at its inner end to the respective pyramidal wire. The opposite end of each of said parallel wires is secured, as by soldering, to the end wall of the resonator adjacent the opening therein through which the keep-alive electrode projects.

A further modification is shown in Figure 8 wherein fixed end wall 26 supports a solid, instead of tubular, gap electrode 40''. Instead of a rod electrode for keep-alive purposes, the inner end of this gap electrode 40'' may have a radio-active or gamma emission material, such as radium 41'' as the keep-alive electrode, in which event no external source of potential is required. This radio-active salt may also be placed on the effective portion of electrode 40 in Figure 3 thereby eliminating the use of the hollow tube 40 and rod 41'.

We claim:

1. In combination, a wave guide having dimensions for and conducting propagated pulsed wave energy of a predetermined mode, a resonator intercepting the continuity of said wave guide and having entry means for the said wave energy, said resonator having resonance disruption producing means therein for disrupting resonance and electrically reflecting large pulses of said pulsed wave energy, but allowing free passage of received energy between said large pulses, a keep-alive electrode for speeding resonance disruption by said means, and means for dampening other modes in the resonator than the desired mode.

2. A TR box comprising a hollow-body resonator, opposed spark-gap electrodes in said resonator, one of said electrodes comprising parallel wires spaced from a common axis, and a keep-alive electrode on said axis and spaced from said wires.

3. A TR box comprising a hollow-body resonator, opposed spark-gap electrodes in said resonator one of said electrodes comprising parallel wires spaced from a common axis, and an area of gamma ray emissive material in said resonator substantially in the line of discharge between and functioning as a keep-alive electrode for the spark-gap electrodes.

4. A TR box comprising a hollow-body resonator resonant to low power wave energy, opposed spark-gap electrodes in said resonator constructed and arranged for shorting high power wave energy, and damping means in said resonator for damping undesired modes in said resonator, said damping means being connected to and projecting from one of said electrodes.

5. A TR box comprising a hollow-body resonator resonant to low power wave energy, coaxial and opposed spark-gap electrodes spaced longitudinally from each other and constructed and arranged for shorting high power wave energy, and damping means in said resonator for damping undesired modes in said resonator, said damping means being connected to and projecting from one of said electrodes.

6. A TR box comprising a hollow-body resonator resonant to low power wave energy, said resonator having end walls at the axial ends thereof, opposed spark-gap electrodes in said resonator constructed and arranged for shorting high power wave energy, and damping means in said resonator for damping undesired modes in said resonator, said damping means being connected to and projecting from one of said electrodes and one of said ends of the resonator.

7. A TR box comprising a hollow-body resonator resonant to low power wave energy, said resonator having end walls at the axial ends thereof, opposed spark-gap electrodes in said resonator each projecting inwardly thereof from an opposite end wall and having their inward ends in proximity but spaced from each other for shorting high power wave energy, and damping means within said resonator connected to each of said electrodes for damping out undesired modes of oscillation in the resonator.

8. A TR box comprising a hollow-body resonator resonant to low power wave energy, said resonator having end walls at the axial ends thereof, opposed spark-gap electrodes in said resonator each projecting inwardly thereof from an opposite end wall and having their inward ends in proximity but spaced from each other for shorting high power wave energy, and damping means for each of said electrodes for damping out undesired modes of oscillation in the resonator, the damping means for one electrode being connected to the end wall from which that electrode projects and the damping means for the other electrode being connected to the other end wall.

9. A TR box comprising a hollow-body resonator resonant to low power wave energy, said resonator having end walls at the axial ends thereof, opposed spark-gap electrodes in said resonator each projecting inwardly thereof from an opposite end wall and having their inward ends in proximity but spaced from each other for shorting high power wave energy, and damping means for each of said electrodes for damping out undesired modes of oscillation in the resonator, said damping means extending diagonally away from the inward proximate ends of said electrodes.

10. A TR box comprising a hollow-body resonator resonant to low power wave energy, said resonator having end walls at the axial ends thereof, opposed spark-gap electrodes in said resonator each projecting inwardly thereof from an opposite end wall and having their inward ends in proximity but spaced from each other for shorting high power wave energy, and damping means for each of said electrodes for damping out undesired modes of oscillation in the resonator, said damping means for one electrode being connected thereto and to the end wall from which that electrode projects and the damping means for the other electrode being connected thereto and to the other end wall.

11. In combination, an antenna, a wave generator connected to said antenna, a receiver, a wave guide connecting said antenna and receiver, a resonator interposed in said wave guide for controlling propagation characteristics of said wave guide, damping means in said resonator for damping undesired modes in said resonator, and means in said resonator for controlling energization of said receiver.

12. A cavity resonator comprising a block of conductive material having a hole extending therethrough, means including a glass closure sealing the hole in said block, a fixed electrode mounted inside said block in the hole therein, a flexible wall portion incorporated in the wall of said block, a movable electrode attached to the inside of said flexible wall portion, a filling of ionizable gas within said block and means attached to the external surface of said block and to said flexible wall portion for varying the position of said movable electrode.

13. A transmission control device comprising a cavity resonator having a pair of aligned poles carried on opposite wall sections thereof, and an ionizable gaseous medium comprising water vapor filling the space between said poles at a pressure greatly less than atmospheric pressure, said resonator being adapted when excited by waves of its resonant frequency to establish an arc discharge across said poles when said waves exceed a predetermined amplitude.

14. A transmission control device comprising a cavity resonator having a pair of aligned poles carried on opposite wall sections thereof, an ionizable gaseous medium comprising water vapor filling the space between said poles at a pressure greatly less than atmospheric pressure, said resonator being adapted when excited by waves of its resonant frequency to establish an arc discharge across said poles when said waves exceed a predetermined amplitude, and means for maintaining a continuous keep-alive discharge adjacent one of said poles.

References Cited in the file of this patent

UNITED STATES PATENTS

| | | |
|---|---|---|
| 1,035,958 | Girardeau | Aug. 20, 1912 |
| 1,269,534 | Gray | June 11, 1918 |
| 1,962,062 | Evans | June 5, 1934 |
| 2,089,555 | Hull et al. | Aug. 10, 1937 |
| 2,199,045 | Dallenbach | Apr. 30, 1940 |
| 2,203,806 | Wolf | June 11, 1940 |
| 2,235,010 | Chaffee | Mar. 18, 1941 |
| 2,253,589 | Southworth | Aug. 26, 1941 |
| 2,261,130 | Applegate | Nov. 4, 1941 |
| 2,263,648 | Salzberg | Nov. 25, 1941 |
| 2,281,274 | Dallenbach | Apr. 28, 1942 |